United States Patent Office 3,136,750
Patented June 9, 1964

---

3,136,750
AZO DYESTUFFS
Willy Steinemann, Basel, Switzerland, assignor to Sandoz Ltd., Basel, Switzerland
No Drawing. Filed Aug. 1, 1960, Ser. No. 46,348
Claims priority, application Switzerland Aug. 11, 1959
8 Claims. (Cl. 260—148)

This invention relates to valuable new azo dyestuffs and their metal complex compounds which in the metal-free state may have the formula

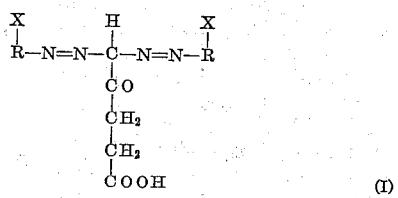

wherein R represents the radical of a diazo compound of the benzene series
and X represents a hydroxy or a carboxy group in ortho position to either azo bridge.

The process for the production of these dyestuffs consists in coupling 1 mole of levulinic acid with 2 moles of a diazo compound of the benzene series which contains in ortho position to the diazo group a hydroxyl or a carboxyl group, and metallizing the resulting dyestuff with a metal-yielding agent in substance or on the fiber.

Suitable diazo components are 2-aminobenzene-1-carboxylic acid and 2-amino-1-hydroxybenzenes which may be substituted in the nuclei by, e.g., carboxyl groups, sulfonic acid groups, alkyl- or arylsulfonyl groups, sulfonic acid amide groups which may be N-mono- or disubstituted, alkyl groups, more especially those with up to 4 carbon atoms, alkoxy groups, aryl groups, especially phenyl or naphthyl radicals, nitro groups or halogen atoms, in particular fluorine, chlorine or bromine.

The diazo components may also contain azo groups and may themselves be metallizable or metallized. Further they may bear substituents which are capable of dyestuff formation, e.g. of azo dyestuffs, in which case poly-azo dyestuffs can be subsequently produced from them by azo coupling. Examples of suitable substituents capable of azo dyestuff formation are diazotizable amino groups and substituents convertible into such groups, e.g. reducible nitro or readily hydrolysable acylamino groups, or couplable carbon atoms.

The coupling reaction is carried out in the alkaline pH region, preferably at pH 10–14, a suitable alkaline value being obtained by an addition of an agent of alkaline reaction, e.g. basic metal hydroxides, in particular hydroxides of alkali or earth alkali metals, or of magnesium. The coupling reaction can be effected in purely aqueous medium or in a predominantly organic medium. Often it is beneficial to add an amount of organic solvent one to five times greater than the weight of the coupling component. Suitable organic solvents are the acetamides or formamides, especially dimethylformamide, hydrocarbons which may be substituted, e.g. chlorobenzene, and pyridine. Dispersing agents can also be used. Diazo compounds containing sulfonic acid groups are coupled preferably in presence of low molecular carboxylic acid dialkylamides, such as dimethylformamide or -acetamide, or low molecular trialkylamines such as triethylamine. The coupling reaction is conducted preferably at temperatures between about −10° C. and +10° C., especially at 0–5° C.

For metallizing the dyestuffs of Formula I in substance copper- or nickel-yielding agents are preferably used, e.g. copper formate, copper acetate, copper sulfate or the corresponding nickel compounds.

Coppering can be carried out by the known methods, i.e. by heating the dyestuff with the copper salt in a weakly acid to alkaline medium, if necessary under pressure and/or in presence of ammonia and/or organic bases, or in a concentrated aqueous solution of an alkali metal salt of a low molecular aliphatic monocarboxylic acid. In the after-treatment of dyeings of the metal-free dyestuffs with metal-yielding, preferably nickel- or copper-yielding, agents, it is particularly advantageous to carry out the operation in presence of a polyalkylene polyamine.

The new dyestuffs of Formula I are used for various purposes, e.g. dyeing, padding and printing. Those which possess no water-solubilizing groups can be used as disperse dyestuffs for the dyeing of artificial fibers e.g. acetylated cellulose such as secondary cellulose acetate or cellulose triacetate and polyterephthalic acid glycol esters. Those with water-solubilizing groups, e.g. of the series of the sulfonic acid, sulfonic acid amide, sulfonyl or carboxylic acid groups, are used for dyeing textiles of all kinds. Many of the dyestuffs, e.g. the low molecular products, are successfully used for dyeing e.g. wool, silk, synthetic polyamides and leather, and they can be metallized in substance or on the fiber as they possess substituents capable of metal complex formation. Others, e.g. the higher molecular-weight dyestuffs with complex combined metal or substituents capable of metal complex formation, dye e.g. natural cellulose such as cotton, regenerated celluloses such as viscose filament yarn, viscose staple fiber and cuprammonium rayon as well as leather.

The dyeings on cellulosic fibers are very deep and brilliant in shade and possess good fastness to boiling, washing, perspiration, light and crocking and are stable to carboxylic acids.

The dyeings on wool and synthetic polyamide fibers are brilliant and fast to light, water, washing, milling, sublimation and crocking. They are also stable to carboxylic acids but are white dischargeable by treatment with peroxides or $H_2O_2$ in acid solution.

The water-soluble metal complex dyestuffs can be transformed into color lakes by treating with calcium, strontium, barium or lead salts. The thus obtained pigments are used for the mass dyeing of plastic materials, synthetic resins, varnishes, paper and synthetic fibers spun from their solutions in organic solvents. The dyeings are brilliant and possess good fastness to light, migration and wet treatments.

In the following examples the parts and percentages are by weight and the temperatures in degrees centigrade.

*Example 1*

27.8 parts of 2-amino-1-hydroxybenzene-4-sulfonic acid phenylamide are dissolved in 150 parts of hot water with 19 parts of 30% hydrochloric acid. The solution is diazotized at 0–2° by the addition of 7.3 parts of sodium nitrite. The diazo compound precipitates in form of a yellow diazo suspension whose pH is adjusted to 8 with sodium carbonate. This suspension is added in small portions in the course of 1 hour to an ice-cold solution obtained as follows: 14.9 parts of triethanolamine and 22 parts of 1.2-dichlorobenzene are added successively to 65 parts of a 20% aqueous solution of copper sulfate ($CuSO_4.5H_2O$), followed by 5.8 parts of freshly distilled levulinic acid and 85 parts of 30% sodium hydroxide solution. The mass is stirred at 0–5° until the coupling reaction is completed, then an equal volume of water is added and at room temperature sufficient 5% hydrochloric acid is dropped in to bring the pH to 5. Finally the well filterable, completely precipitated copper-containing dyestuff is filtered off, dissolved in dilute sodium carbonate solution, salted out with sodium chloride at room temperature, filtered off, washed with sodium chloride solution, dried and ground. It dissolves in concentrated sulfuric acid with a blue coloration which after a short time changes to red. It is suitable e.g. for dyeing polyamide fibers, wool and silk from neutral baths and acetate in the spinning solution. Very fast brilliant blue dyeings are obtained.

When the 65 parts of 20% aqueous copper sulfate solution are replaced by the corresponding amount of nickel sulfate, a nickel-containing dyestuff is obtained by the same procedure which dyes wool, silk and polyamide fibers in fast blue-red shades.

When in place of the 27.8 parts of 2-amino-1-hydroxybenzene-4-sulfonic acid phenylamide the equivalent amount of 2-amino-1-hydroxy-benzene-5-sulfonic acid-phenylamide,
2-amino-1-hydroxy-benzene-4- or -5-sulfonic acid-amide,
2-amino-1-hydroxy-benzene-4- or -5-sulfonic acid-methyl-amide,
2-amino-1-hydroxy-benzene-4- or -5-sulfonic acid-isopropylamide,
2-amino-1-hydroxy-benzene-4- -5-sulfonic acid di-(2'-hydroxyethyl)-amide,
2-amino-1-hydroxy-benzene-4- or -5-sulfonic acid-cyclohexyl-amide,
2-amino-1-hydroxy-benzene-4- or -5-sulfonic acid-2'-hydroxy-ethylamide,
2-amino-1-hydroxy-benzene-4- or -5-sulfonic acid-2'-hydroxy-butylamide,
2-amino-1-hydroxy-benzene-4- or -5-sulfonic acid-2'-methoxy-ethylamide,
2-amino-1-hydroxy-benzene-4- or -5-sulfonic acid-3'-methoxy-propylamide,
2-amino-1-hydroxy-benzene-4- or -5-sulfonic acid-3'-sulfamido-phenylamide,
2-amino-1-hydroxy-benzene-4- or -5-sulfonic acid diethylamide,
2-amino-1-hydroxy-benzene-4- or -5-sulfonic acid-dimethylamide or
2-amino-1-hydroxy-benzene-4- or -5-sulfonic acid benzylamide is used and the above-described procedure is followed, very similar and equally good dyestuffs are obtained which give very similar shades.

Example 2

28.6 parts of 2-amino-1-hydroxy-4-chlorobenzene are diazotized in an ice-cold mixture of 20 parts of 30% hydrochloric acid and 80 parts of water with 13.8 parts of sodium nitrite. Sodium carbonate is added until the pH is 8.5. The diazo suspension is poured at maximum 0° into a solution of 250 parts of water, 25 parts of sodium hydroxide and 11.6 parts of levulinic acid, and the mass stirred at 0° until coupling is completed. The reaction mass is diluted with 500 parts of water and the new dyestuff precipitated by neutralizing with dilute hydrochloric acid, collected on a filter and washed with cold water.

It is entered in a solution of 28 parts of copper sulfate ($CuSO_4.5H_2O$), 40 parts of 25% aqueous ammonia solution and 1500 parts of water and the mass stirred at 90° until no further copper-free dyestuff is indicated. The copper-containing dyestuff is isolated in the normal way, washed and dried. It is a dark-blue powder which dissolves in water with a blue coloration and dyes wool, silk, synthetic polyamide fibers and leather in brilliant fast blue shades. It is also suitable for the dope-dyeing of acetate.

The nickel-complex of the new dyestuff also gives outstandingly fast dyeings which are slightly more reddish than those of the copper complex.

When the 28.6 parts of 2-amino-1-hydroxy-4-chlorobenzene is replaced by the equivalent amount of:

2-amino-1-hydroxy-4-phenyl-benzene,
2-amino-1-hydroxy-4-nitro-benzene,
2-amino-1-hydroxy-5-nitro-benzene,
2-amino-1-hydroxy-4-chloro-5-nitro-benzene,
2-amino-1-hydroxy-4-chloro-6-nitro-benzene,
2-amino-1-hydroxy-4-nitro-6-chloro-benzene,
2-amino-1-hydroxy-4-acetyl-benzene,
2-amino-1-hydroxy-4-methyl-6-acetyl-benzene,
2-amino-1-hydroxy-4-methylsulfonyl-benzene,
2-amino-1-hydroxy-4.6-dichloro-benzene,
2-amino-1-hydroxy-4-methylbenzene,
2-amino-1-hydroxy-4-tert.butyl-benzene,
2-amino-1-hydroxy-4-oxazolidonyl-benzene,
2-amino-1-hydroxybenzene,
2-amino-1-hydroxy-4-pyrrolidonyl-benzene or
2-amino-1-hydroxy-4-chloro-6-pyrrolidonyl-benzene and the same procedure followed, very similar and equally good dyestuffs are obtained.

Example 3

33.2 parts of 2-amino-1-hydroxy-4-acetylaminobenzene are diazotized in dilute ice-cold hydrochloric acid. The yellow diazo solution is neutralized with sodium carbonate and 11.6 parts of levulinic acid are added, together with a copper complex solution of 130 parts of 20% aqueous copper sulfate solution ($CuSO_4.5H_2O$) and 32 parts of triethanolamine. 160 parts of 15% sodium hydroxide are run in quickly, the temperature cooled to below +2° and stirring continued at 0° until coupling is completed. Finally the reaction mass is heated to 30°, dilute acetic acid is run in until the pH is 5, and the copper-containing dyestuff is precipitated with sodium chloride, filtered off, washed with sodium chloride solution, dried and ground. The new dyestuff is a blue powder which dissolves in water to give blue solutions. It dyes wool and synthetic polyamide fibers from a neutral bath in brilliant fast blue shades, and is also suitable for the dope-dyeing of acetate.

The nickel-containing dyestuff produced on analogous lines gives slightly more reddish shades. It has the same good properties as the copper-containing dyestuff. Very similar dyestuffs with equally valuable properties can be produced by replacing the 33.2 parts of 2-amino-1-hydroxy-4-acetylaminobenzene by an equivalent amount of 2-amino-1-hydroxy-4-carbethoxyamino-benzene,
2-amino-1-hydroxy-4-carbomethoxyamino-benzene,
2-amino-1-hydroxy-4-benzoylamino-benzene,
2-amino-1-hydroxy-4.6-diacetylamino-benzene,
2-amino-1-hydroxy-4-chloro-6-acetylamino-benzene,
2-amino-1-hydroxy-4-acetylamino-6-chloro-benzene,
2-amino-1-hydroxy-4-methylsulfonylamino-benzene,
2 - amino - 1 - hydroxy-4-dimethylaminosulfonylamino-benzene,
2 - amino - 1 - hydroxy - 4-(4'-methylphenylsulfonylamino)-benzene,
2 - amino - 1-hydroxy-4-(4'-acetylaminophenylsulfonylamino)-benzene,
2 - amino - 1-hydroxy-4-(3'-acetylaminophenylsulfonylamino)-benzene,
2-amino-1-hydroxy-4-propionylamino-benzene,
2-amino-1-hydroxy-4.6-dipropionylamino-benzene or
2-amino-1-hydroxy-4-chloro-6-butyrylamino-benzene.

Example 4

61.6 parts of 2-amino-1-hydroxybenzene-4-sulfonic acid-2'-carboxy-phenylamide are dissolved in the form of the sodium salt in 600 parts of water. After the addition of 14 parts of sodium nitrite the solution is run slowly with thorough stirring into ice-cold dilute hydrochloric acid and the resulting suspension is maintained at 0–5° until diazotization is completed. The diazo compound is almost completely precipitated and is filtered off and added to a solution at maximum 0° of 130 parts of 20% aqueous copper sulfate solution ($CuSO_4.5H_2O$), 17 parts of hydroxyethylamine, 11.6 parts of levulinic acid and 140 parts of 15% sodium hydroxide solution. Stirring is continued at 0° until completion of the reaction. Finally the mass is diluted with 500 parts of water, the pH brought to 5 and the new copper-containing dyestuff salted out with sodium chloride. It is dried and ground to give a blue powder which dissolves in water with a blue coloration and dyes wool, silk and synthetic polyamide fibers from a neutral bath in bright fast blue shades. The nickel-containing dyestuff produced on analogous lines has equally good properties and gives a slight more reddish shade.

Dyestuffs with equally good properties can be produced when the 61.6 parts of 2-amino-1-hydroxybenzene-4-sulfonic acid-2'-carboxylphenylamide are replaced by an equivalent amount of 2-amino-1-hydroxybenzene-4-sulfonylamino-acetic acid,
2-amino-1-hydroxy-4-phthaloylamino-benzene,
2-amino-1-hydroxy-4-maleylamino-benzene,
2-amino-1-hydroxy-4-succinylamino-benzene,
2-amino-1-hydroxy-4-(3'- or 4'-carboxyphenyl-sulfonylamino)-benzene,
2-amino-1-hydroxy-4-phenylbenzene-4'-sulfonic acid,
2-amino-1-hydroxy-4-nitro-6-phenylbenzene-4'-sulfonic acid or
2-amino-1-hydroxybenzene-4- or -5-sulfonic acid-phenylamide-3'- or -4'-sulfonic acid.

If, however, the 61.6 parts of 2-amino-1-hydroxybenzene-4-sulfonic acid-2'-carboxyphenylamide are replaced by 37.8 parts of 2-amino-1-hydroxybenzene-4-sulfonic acid or 55.2 parts of 2-amino-1-hydroxy-6-carbethoxy-aminobenzene-4-sulfonic acid or 52.4 parts of 2-amino-1-hydroxy-6-carbomethoxyaminobenzene-4-sulfonic acid, the coupling reaction is carried out preferably in the presence of 120 parts of dimethylformamide.

Example 5

27.4 parts of 2-aminobenzene-1-carboxylic acid are dissolved in 200 parts of water with 20 parts of 30% hydrochloric acid and diazotized in the normal way with 13.8 parts of sodium nitrite. The pH value of the diazo solution is increased to 12 by running in 60 parts of 30% sodium hydroxide solution, the temperature being maintained below +2° by good cooling. With vigorous stirring and cooling to below +2°, 58 parts of a 20% solution of levulinic acid in water are added dropwise at an even rate in 1 hour. Stirring is continued at 0° until the coupling reaction is completed. The new dyestuff is precipitated from the brown reaction solution by dropping in acetic acid until the resulting suspension is of pH 5. The precipitated dye-stuff is filtered off, washed with aqueous sodium chloride solution, carefully dried and ground. It is obtained as a red-brown powder which readily dissolves in water and dyes wool and synthetic polyamide fibers from a neutral or weakly acid bath. On treatment with copper- or nickel-yielding agents the dyeings are of red-brown or olive-green shade respectively and possess very good fastness to light and wet agencies.

If dyestuffs metallized in substance are desired, the diazo compound is coupled with levulinic acid, e.g. in presence of a solution of a copper or nickel complex, according to the procedure given in Example 1. The copper-or nickel-containing dyestuffs so formed dye wool and synthetic polyamide fibers from a neutral to weakly acid bath in grayish red or green shades.

Example 6

2 parts of the copper-containing dyestuff obtained according to Example 1 are dissolved in 4000 parts of water at 40–50°. After the addition of 4 parts of ammonium sulfate 100 parts of prewetted wool are introduced into the dyebath which is then heated to the boil in the course of 30 minutes and maintained at the boil for a further period of 45 minutes. The dyed wool is then removed from the bath, rinsed with water and dried. A brilliant blue dyeing is obtained which is fast to light, water, washing, milling, perspiration and crocking.

Having thus disclosed the invention, what I claim is:

1. A dye obtained by (a) coupling in an alkaline medium in the pH range from 7 to 14 at a temperature below 10° C. one mole of levulinic acid with two moles of the diazotization product of a compound of the formula $$X-R-NH_2$$

wherein

R is a benzene radical selected from the group consisting of phenylene containing no further substituents and a benzene radical further substituted with a member selected from the group consisting of sulfonamido, lower alkyl, phenyl, nitro, chloro, —$SO_3H$, lower alkyl sulfonyl, acetyl, oxazolidonyl, pyrrolidonyl, acetylamino, diacetylamino, carb(lower)alkoxyamino, benzoylamino, methylsulfonylamino, dimethylaminosulfonylamino, 4-methylphenylsulfonylamino, 3-acetylaminophenylsulfonylamino, 4-acetylaminosulfonylamino, propionylamino, di(propionylamino), butyrylamino, sulfonylaminoacetic acid, phthaloylamino, maleylamino, succinylamino and carboxyphenylsulfonylamino; and X is in ortho-position to the —$NH_2$ group and is a member selected from the group consisting of hydroxy and carboxy;

and (b) precipitating the resulting dyestuff.

2. The copper complex compound of an azo dye according to claim 1.

3. The nickel complex compound of an azo dye according to claim 1.

4. The azo dye copper complex compound obtained by (I) coupling in an alkaline medium in a pH range of from 10 to 14 at a temperature from 0° to 5° C. (a) one mole of levulinic acid with (b) two moles of 2-diazo-1-hydroxybenzene-4-sulfonic acid phenylamide, (II) coppering the thus-formed azo dye and (III) acidifying the resulting product to a pH of 5, whereby said azo dye copper complex compound is precipitated.

5. The azo dye obtained by (I) coupling at a temperature of 0° C. in an alkaline medium having a pH of from 10 to 14 (a) one mole of levulinic acid with (b) two moles of 2-diazo-1-hydroxy-4-chlorobenzene and (II) neutralizing the resulting product, whereby said azo dye is precipitated.

6. The azo dye copper complex compound obtained by (I) coupling at a temperature of 0° C. in an alkaline medium having a pH of from 10 to 14 (a) one mole of levulinic acid with (b) two moles of 2-diazo-1-hydroxy-4-acetylaminobenzene, (II) coppering the thus-formed azo dye, (III) acidifying the resulting product to a pH of 5 and (IV) salting out said azo dye copper complex compound.

7. The azo dye copper complex compound obtained by (I) coupling at a temperature of 0° C. in an alkaline medium having a pH of from 10 to 14 (a) one mole of levulinic acid with (b) two moles of 2-diazo-1-hydroxybenzene-4-sulfonic acid-2'-carboxyphenylamide, (II) coppering the thus-formed azo dye, (III) acidifying the resulting product to a pH of 5 and (IV) salting out said azo dye copper complex compound.

8. The azo dye obtained by (I) coupling at a temperature below 2° C. in an alkaline medium having a pH of from 10 to 14 (a) one mole of levulinic acid with (b) two moles of 2-diazobenzene-1-carboxylic acid and (II) acidifying the resulting product to a pH of 5, whereby said azo dye is precipitated.

References Cited in the file of this patent

UNITED STATES PATENTS 2,366,633    Long _____ Jan. 2, 1945

OTHER REFERENCES

Bamberger et al.: Journal fur Prakt Chemie, Bd. 172 N.F. 64 (1901) page 215, TP 1. J89.

Mossini, A.: Chem. Abstracts, vol. 34 (1940) page 7916.